United States Patent Office 2,960,460
Patented Nov. 15, 1960

2,960,460

PRODUCTION OF MOTOR FUELS FROM OLEFIN-CONTAINING NAPHTHAS WITH A CATALYST COMPRISING ZINC OXIDE AND ZINC CHROMITE

Jack Ryer, Wappingers Falls, Marc F. Fontaine, Fishkill, and Edward R. Christensen, Beacon, N.Y., assignors to Texaco Inc., a corporation of Delaware No Drawing. Filed Dec. 10, 1956, Ser. No. 627,096

10 Claims. (Cl. 208—134)

This invention relates to the catalytic treatment of hydrocarbons and more particularly to the treatment of hydrocarbons with a zinc oxide-zinc chromite catalyst. In a preferred embodiment of the invention an olefin-containing stock boiling in the naphtha range is dehydrocyclized over a zinc oxide-zinc chromite catalyst to yield a product having a high octane number and suitable for use as a fuel in high compression internal combustion engines.

It has already been suggested in U.S. Patents 2,205,141, 2,209,458 and 2,304,183 to use zinc chromite as a catalyst for the upgrading of hydrocarbons intended for use as a motor fuel. However, after a relatively short period of use in the processes disclosed in the prior art, the zinc chromite catalyst becomes coated with carbonaceous deposits with attendant loss in activity.

One advantage of our process is that the catalyst does not become coated rapidly with deactivating carbonaceous deposits. Another advantage is that the catalyst can be regenerated a great number of times without any appreciable loss in activity. Some batches of catalyst have been regenerated as many as 40 times. Still another advantage is that the catalyst is not sensitive to heat. The catalyst may be regenerated simply by burning off the carbonaceous deposits with air. Temperature control during the regeneration is unnecessary. In fact, temperatures as high as 1600° F. have been encountered during regeneration without impairing the activity of the catalyst.

According to the process of the present invention, the hydrocarbon to be treated is contacted with a zinc oxide-zinc chromite catalyst at elevated temperatures. The process may be carried out batch-wise or in a continuous manner.

The temperature may range from 600 to 1100° F., a preferred range being 650–1075° F. The process may be operated at pressures ranging from 0–500 p.s.i.g. or higher. The volumetric space velocity, that is volume of feed per volume of catalyst per hour, is preferably 0.2–4, although rates of from 0.1–10 may be used. When low space velocities are used, the process may be operated at atmospheric pressure; when higher space velocities are used, it is preferred to conduct the process at superatmospheric pressure in the presence of added hydrogen. Hydrogen rates may range between 0 and 10,000 cubic feet per barrel of feed. When the product is intended for use as a motor fuel, the use of hydrogen and elevated pressures is advantageous in that the product has a reduced sulfur content and also in that its gum and varnish forming tendency has been greately diminished as is evidenced by its improved General Motors Sludge Number. Since hydrogen is a product of the dehydrocyclization process, the product gas which contains substantial amounts of hydrogen may be recycled to the process.

Although our process is applicable to many hydrocarbon-containing feed stocks, suitable charge materials are those which contain a substantial amount of olefins. When the product is intended for use as a fuel in a high compression internal combustion engine, the preferred starting material is a normally liquid olefin-containing hydrocarbon fraction boiling up to 420° F. and preferably boiling within the range of 145–420° F.

In one embodiment of the invention a charge stock having the following hydrocarbon analysis:

| | Percent |
|---|---|
| Aromatics | 34 |
| Olefins | 41 |
| Saturates | 25 | was treated batch-wise in the presence of a zinc oxide-zinc chromite catalyst at 650° F. and 2000 p.s.i.g. for a period of 5½ hours in the presence of added hydrogen. The product had the following hydrocarbon analysis:

| | Percent |
|---|---|
| Aromatics | 49 |
| Olefins | 25 |
| Saturates | 26 |

In another embodiment, a heavy catalytically cracked naphtha stock having an ASTM Research Octane Number of 87.9 clear and 93.0 when containing 3 cc. tetraethyl lead per gallon was treated in a continuous manner by being passed over a zinc oxide-zinc chromite catalyst at 1000° F., a space velocity of 0.2 and a pressure of 200 p.s.i.g. in the presence of added hydrogen. After 4 hours of continuous operation, the product had an ASTM Research Octane Number clear of 99.4, leaded 103.89.[1] After 30 hours of continuous operation, the product had an ASTM Research Octane Number of 99.0 clear, 101.56[1] leaded. When the run was terminated after 69 hours of continuous operation, the ASTM Research Octane Number of the product was 98.6 clear, 101.07[1] leaded.

The catalyst contains two components namely, zinc oxide and zinc chromite, the zinc chromite being present in amounts ranging from 10–90% based on the combined weight of zinc oxide and zinc chromite. Catalysts containing 25–75% zinc oxide by weight are preferred. The zinc oxide-zinc chromite catalyst may be used alone or may be deposited on a substantially inert base. The catalyst may be prepared in the following manner:

Solution No. 1—3036 grams of C.P. ammonium dichromate were dissolved in ten liters of water. A solution of 2400 ml. concentrated ammonium hydroxide in four liters of water was added.

Solution No. 2—7134 grams of C.P. $Zn(NO_3)_2 \cdot 6H_2O$ were dissolved in 16 liters of water.

Solutions 1 and 2 were then mixed by being added slowly and simultaneously at equal rates with good agitation to a vessel containing four liters of water. Stirring was continued for one-half hour after the addition was complete. 600 ml. concentrated ammonium hydroxide were then added to ensure complete precipitation.

The precipitate was filtered and washed three times with ten liters of water. After having been dried, the powder was decomposed in small portions by heating to incipient decomposition temperature. The decomposition temperature was found to be about 640° F. The powder was then sieved through 20 mesh, pelletted in 5/32" dies with 2% Sterotex and calcined at 750° F. for 12 hours. 2850 grams or 2240 cc. of dark brown pellets were obtained. When the catalyst is intended for use in a fluidized system, the powder is ground to a particle size of less than 200 microns in diameter with a major proportion between 20 and 80 microns.

The resulting catalyst contained 26% ZnO and 74% $ZnCr_2O_4$ by weight. The composition of the catalyst may be varied by using appropriate amounts of ammonium dichromate and zinc nitrate as the starting mate- ---
[1] Wiese scale.

rials. The catalyst may also be prepared by other methods known to those skilled in the art.

In order to illustrate more clearly our invention, the following examples are set forth.

EXAMPLE I

A heavy thermal cracked naphtha was passed over a zinc oxide-zinc chromite catalyst, prepared as outlined above and containing 26% zinc oxide and 74% zinc chromite at atmospheric pressure, a temperature of 1000° F. and a space velocity of 0.2 v./v./hr. The results obtained are set forth in the following table:

Table I

| Hours on Stream | Charge | 4 | 8 |
|---|---|---|---|
| Vol. Percent Recovered $C_4+$ | | 70.4 | 82.2 |
| Wt. Percent Recovered $C_4+$ | | 71.2 | 79.3 |
| Hydrocarbon Analysis: | | | |
| Aromatic | 23 | 62 | 54 |
| Olefin | 25 | 9 | 13 |
| Saturate | 52 | 29 | 33 |
| ASTM Distillation Range: | | | |
| IPB | 218 | 128 | 133 |
| 10% | 256 | 218 | 211 |
| 50% | 303 | 290 | 290 |
| E.P. | 416 | 453 | 456 |
| ASTM Octane No. (Research): | | | |
| Clear | 69.2 | 95.3 | 93.6 |
| +3 cc. TEL | 82.5 | 98.8 | 97.7 |

It will be noted that after four hours on stream, there was an increased in the leaded product of 16.3 octane numbers over the leaded starting material. After eight hours on stream, the increase was 15.2. The large drop in olefin and saturate content with the corresponding increase in aromatic content indicates that considerable cyclization and dehydrocyclization took place.

EXAMPLE II

In this example, a heavy catalytically cracked naphtha was passed over zinc oxide-zinc chromite catalyst containing 26% zinc oxide and 74% zinc chromite at atmospheric pressure, a temperature of 1000° F. and a space velocity of 0.2 v./v./hr. The results obtained are set forth in the following table:

Table II

| Hours on Stream | Charge | 4 | 8 |
|---|---|---|---|
| Vol. Percent Recovered $C_4+$ | | 74.1 | 79.9 |
| Wt. Percent Recovered $C_4+$ | | 74.6 | 79.8 |
| Hydrocarbon Analysis: | | | |
| Aromatic | 40 | 72 | 76 |
| Olefin | 22 | 8 | 7 |
| Saturate | 38 | 20 | 17 |
| ASTM Distillation Range: | | | |
| IBP | 258 | 120 | 113 |
| 10 | 279 | 246 | 239 |
| 50 | 310 | 306 | 306 |
| E.P. | 380 | 476 | 449 |
| ASTM Research Octane No.: | | | |
| Clear | 85.8 | 99.4 | 99.8 |
| +3 cc. TEL | 93.9 | [1] 101.92 | [1] 102.03 |

[1] Wiese scale.

These results show a product was obtained which had a clear octane number in excess of 99 and a leaded octane number in the 102 range. As in Example I, these results show that extensive cyclization and dehydrocyclization took place.

EXAMPLE III

A heavy fluid catalytically cracked naphtha was passed over a zinc oxide-zinc chromite catalyst containing 26% zinc oxide and 74% zinc chromite at a temperature of 1000° F., a space velocity of 0.5 v./v./hr., a pressure of 400 p.s.i.g., fresh hydrogen input of 3180 cubic feet per barrel of feed and various gas recycle rates. The results obtained are set forth in the following table:

Table III

| Gas Recycle s.c.f./bbl | Charge | 8,080 | 6,120 | 4,160 | 2,200 |
|---|---|---|---|---|---|
| Time on Stream | | 12 | 36 | 52 | 80 |
| Vol. Percent Recovered $C_4+$ | | 80.5 | 84.1 | 86.1 | 85.7 |
| Wt. Percent Recovered $C_4+$ | | 79.2 | 83.4 | 84.7 | 84.1 |
| Hydrocarbon Analysis: | | | | | |
| Aromatics | 39 | 60 | 54 | 54 | 53 |
| Olefins | 23 | 4 | 5 | 5 | 6 |
| Saturates | 38 | 36 | 41 | 41 | 41 |
| ASTM Research Octane No.: | | | | | |
| Clear | 87.9 | 96.0 | 92.0 | 93.0 | 90.2 |
| +3 cc. TEL | 93.0 | [1] 101.44 | 98.8 | 99.1 | 98.6 |
| G.M. Sludge No | 88 | 23 | 19 | 18 | 20 |
| Percent Sulfur | 0.1 | 0.002 | 0.017 | 0.015 | 0.002 |

[1] Wiese scale.

The General Motors Sludge Number is arrived at by colorimetric method for determining the conjugated diolefin content of a fuel fraction and is described in detail in a booklet entitled "Research Technique for the Determination of Varnish and Sludge Forming Characteristics of Motor Fuels" issued by the Research Laboratories Division of General Motors Corporation.

In addition to improving the General Motors Sludge Number, the catalyst also showed good desulfurization properties. This example also shows that the catalyst activity remained relatively high throughout the eighty hours of continuous operation.

EXAMPLE IV

In this example, a heavy catalytically cracked naphtha similar to that used in Example III was passed at a temperature of 1000° F. atmospheric pressure and a space velocity of 0.2 v./v./hr. over catalysts containing varying amounts of zinc oxide, zinc chromite and chromium oxide. In each case the run lasted 24 hours. Samples A represent the products for the first 12 hour period and Samples B represent the products for the second 12 hour period. The results obtained are set forth in the following table.

Table IV

| Run No | 1 | | 2 | | 3 | | 4 | | 5 | |
|---|---|---|---|---|---|---|---|---|---|---|
| Catalyst: | | | | | | | | | | |
| Percent ZnO | 61.5 | | 26.0 | | | | 72.0 | | | |
| Percent $ZnCr_2O_4$ | 38.5 | | 74.0 | | 100 | | 28.0 | | | |
| Percent $Cr_2O_3$ | | | | | | | | | 100 | |
| X-Ray Analysis | $ZnO.ZnCr_2O_4$ | | $ZnO.ZnCr_2O_4$ | | $ZnCr_2O_4$ | | $ZnCr_2O_4.Cr_2O_3$ | | $Cr_2O_3$ | |
| Sample | A | B | A | B | A | B | A | B | A | B |
| Vol. Percent Recovered $C_5+$ | 85.3 | 89.2 | 80.5 | 88.4 | 75.0 | 85.1 | 79.1 | 97.5 | 75.6 | 88.0 |
| Wt. Percent Recovered $C_5+$ | 85.3 | 88.9 | 83.8 | 88.3 | 75.3 | 92.0 | 80.2 | 98.5 | 75.3 | 88.3 |
| ASTM Research Octane No.: | | | | | | | | | | |
| Clear | 95.6 | 94.4 | 96.4 | 94.5 | 97.5 | 96.0 | 96.7 | 94.6 | 95.5 | 94.6 |
| +3 cc. TEL | 100 | 100.1 | 99.9 | 98.9 | 100.5 | 98.4 | 100.1 | 98.6 | 99.4 | 98.6 |
| Wt. Percent Carbon (Basis catalyst) | | 6.11 | | 4.19 | | 13.89 | | 10.44 | | 10.3 |

The above results show that the chromium oxide, zinc chromite and chromium oxide-zinc chromite catalysts produced large amounts of carbon, whereas the production of carbon in the case of the zinc oxide-zinc chromite catalysts was considerably lower.

The foregoing examples are for illustrative purposes only and are not to be considered as limiting the invention in any manner.

Various modifications of the present invention may be made by those skilled in the art without departing from the spirit of the invention.

We claim:

1. The process of treating a normally liquid olefin-containing charge stock which comprises contacting said olefin-containing charge stock with catalyst comprising zinc oxide and zinc chromite at a temperature between about 600 and 1100° F., said catalyst containing between 10 and 90% zinc oxide based on the combined weights of zinc oxide and zinc chromite.

2. The process of claim 1 in which the pressure is between 0 and 500 p.s.i.g.

3. The process of claim 1 in which the catalyst contains between 25 and 75% by weight zinc oxide based on the combined weight of zinc oxide and zinc chromite.

4. A process for the production of a motor fuel of high octane number which comprises contacting a normally liquid olefin-containing naphtha fraction with a catalyst comprising zinc oxide and zinc chromite at a temperature between about 600 and 1100° F., said catalyst containing between 10 and 90% zinc oxide based on the combined weights of zinc oxide and zinc chromite.

5. The process of claim 4 in which the pressure is between 0 and 500 p.s.i.g.

6. The process of claim 5 in which the naphtha fraction is a thermally cracked naphtha.

7. The process of claim 5 in which the naphtha fraction is a catalytically cracked naphtha.

8. The process of claim 5 in which the pressure is superatmospheric and in which the reaction is conducted in the presence of added hydrogen.

9. A process for producing a motor fuel of high octane number and low sulfur content which comprises contacting a cracked naphtha fraction with a catalyst comprising zinc oxide and zinc chromite, the zinc oxide being present in an amount between 25 and 75% by weight based on the combined weight of the zinc oxide and zinc chromite at a temperature between 900 and 1100° F., a pressure of about 400 p.s.i.g. and a space velocity between 0.2 and 1 v./v./hr. in the presence of added hydrogen.

10. A process for the production of a motor fuel of high octane number which comprises contacting a normally liquid olefin-containing naphtha fraction at a temperature between about 600 and 1100° F. with a catalyst comprising zinc oxide and zinc chromite supported on a substantially inert base, said catalyst containing between 10 and 90% zinc oxide based on the combined weights of zinc oxide and zinc chromite.

References Cited in the file of this patent

UNITED STATES PATENTS

| | | |
|---|---|---|
| 1,746,782 | Lazier | Feb. 11, 1930 |
| 2,066,153 | Lazier | Dec. 29, 1936 |
| 2,209,458 | Heard et al. | July 30, 1940 |
| 2,608,534 | Fleck | Aug. 26, 1952 |